US007469225B1

(12) United States Patent
Perrucci

(10) Patent No.: US 7,469,225 B1
(45) Date of Patent: Dec. 23, 2008

(54) REFINANCING MODEL

(75) Inventor: Stefania A. Perrucci, Philadelphia, PA (US)

(73) Assignee: Morgan Stanley, New York, NY (US)

( * ) Notice: Subject to any disclaimer, the term of this patent is extended or adjusted under 35 U.S.C. 154(b) by 381 days.

(21) Appl. No.: 11/158,462

(22) Filed: Jun. 22, 2005

(51) Int. Cl.
  *G06Q 40/10* (2006.01)
(52) U.S. Cl. ...................................... 705/35
(58) Field of Classification Search ............ 705/35
  See application file for complete search history.

(56) References Cited

U.S. PATENT DOCUMENTS

| | | | | |
|---|---|---|---|---|
| 7,003,491 | B2* | 2/2006 | Starkman | 705/38 |
| 2002/0052836 | A1 | 5/2002 | Galperin et al. | |
| 2003/0105696 | A1* | 6/2003 | Kalotay et al. | 705/35 |
| 2004/0128232 | A1 | 7/2004 | Descloux | |
| 2005/0182702 | A1* | 8/2005 | Williams | 705/35 |
| 2005/0273429 | A1* | 12/2005 | Deckoff | 705/40 |

OTHER PUBLICATIONS

Jimmy Hilliard et al, Valuing Prepayment and Default in a Fixed Rate Mortgage: A bivariate binomial options pricing technique, Journal of Real Estate Economics, pp. 431-442, http://www.areuea.org/publications/ree/articles/V26/REE.V26.3.3.PDF.*

* cited by examiner

*Primary Examiner*—James P. Trammell
*Assistant Examiner*—Abdul Basit
(74) *Attorney, Agent, or Firm*—Kirkpatrick & Lockhart Preston Gates Ellis LLP

(57) ABSTRACT

A method for modeling a current expected prepayment spread for a mortgage-backed security (MBS) as a function of a current refinance activity is disclosed. According to various embodiments, the method comprises the steps of computing a historical MBS prepayment spread value and determining a historical refinance activity value for each of a plurality of historical time value. The historical MBS prepayment spread value and the corresponding historical refinance activity value define a data pair. The method further comprises the step of processing the data pairs corresponding to the plurality of historical time values to determine terms of a multiple-term mathematical formula that is used to calculate the current expected prepayment spread, wherein the terms of the formula include as a variable the current refinance activity.

20 Claims, 7 Drawing Sheets

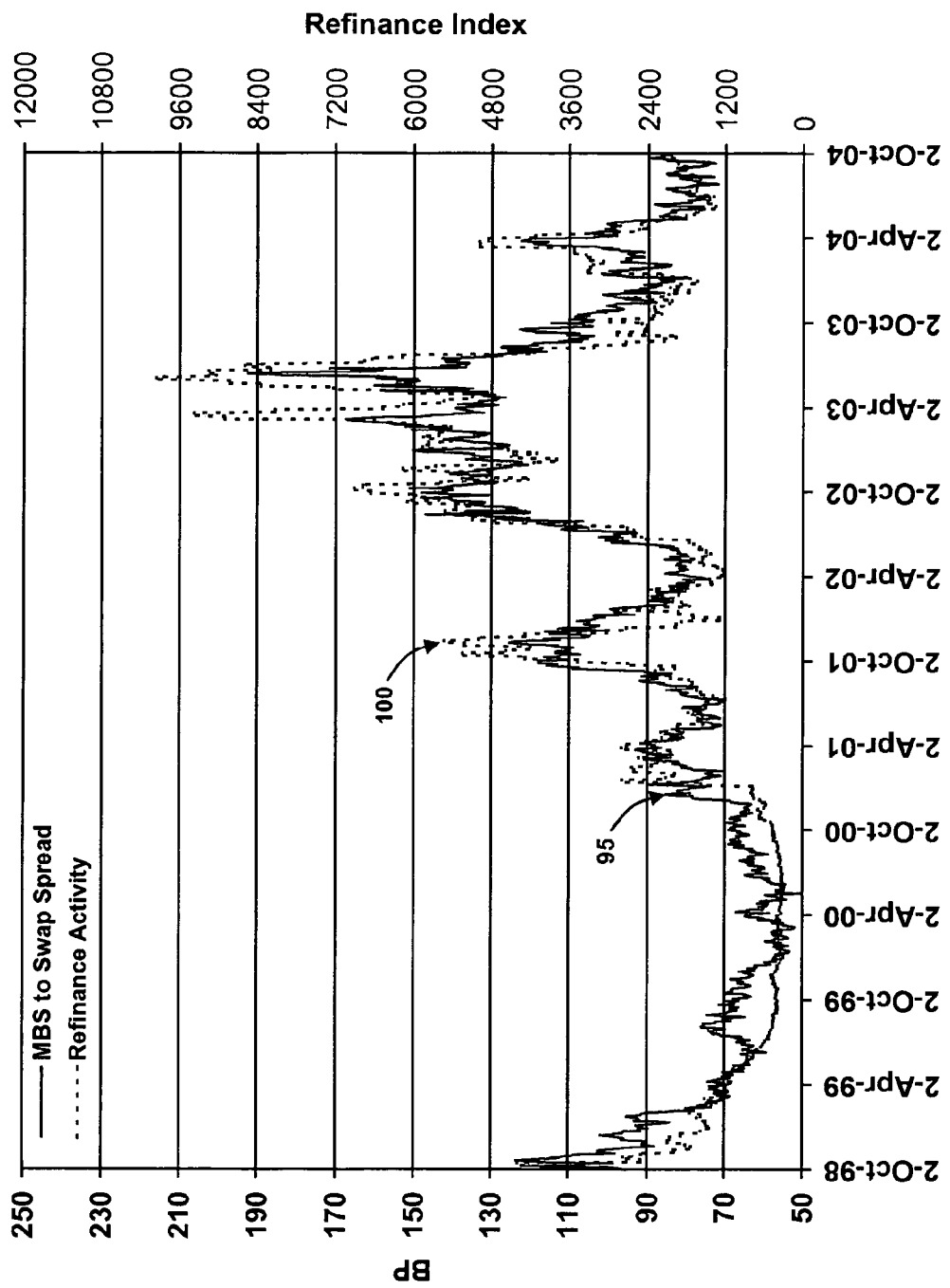

REFINANCING MODEL

BACKGROUND OF THE INVENTION

The present invention relates generally to the valuation of mortgage-backed securities.

Mortgage-backed securities (MBSs) are popular among investors seeking a fixed-income investment having a yield generally greater than that of U.S. Treasuries or corporate bonds. A MBS is an ownership position in a pool of mortgage loans. Each mortgage loan underlying a MBS may originate in the primary mortgage market with the issuance of a mortgage loan by a loan originator to a mortgagor, typically a homebuyer. The originator may then resell the mortgage loan on the secondary mortgage market for securitization by a government-sponsored enterprise (GSE) such as, for example, Ginnie Mae, Fannie Mae, or Freddie Mac. Securitization refers to the process of MBS creation whereby mortgage loans purchased by, for example, a GSE are grouped into pools based upon loan characteristics, such as, for example, interest rate and time to maturity. Each pool is then divided into ownership shares (i.e., the MBSs) for sale to MBS investors, with each investor receiving a pro rata share of the principal and interest cash flows as the underlying mortgage loans are repaid. MBSs created by a GSE are generally referred to as agency MBSs.

One feature differentiating MBSs from other types of fixed income securities is the risk of prepayment associated with the underlying mortgage loans. In particular, because a mortgagor is typically allowed to prepay their mortgage loan in whole or in part without penalty, a MBS investor must assume the risk that MBS cash flows will be received sooner than anticipated. Prepayment risk depends upon a variety of factors, the most significant being the market interest rate. Generally, the value of a fixed-income investment increases when the market interest rate decreases. The same is true of a MBS, but only to a limited extent. In particular, if the market interest rate decreases below the interest rates of mortgage loans underlying a MBS, some mortgagors may find it financially advantageous to refinance their mortgage loans at the lower market rate. The prepayment of mortgage loans resulting from such refinancing activity forces a MBS investor to re-invest the prepaid amounts at the lower market interest rate, thus decreasing the return on investment. To compensate for this prepayment risk, MBSs typically provide higher returns compared to other fixed-income securities.

MBS valuation methodologies typically model the prepayment privilege as an embedded option written by the MBS investor. Thus, the price of an agency MBS may be stated as the price of an agency bond price less the value of the prepayment option. For MBS investors utilizing these valuation methodologies, the ability to accurately quantify and forecast changes in the prepayment option value is vital for realizing an optimal investment strategy. One known technique for valuing the prepayment option is to decompose a MBS yield curve into its constituent yield components so that the yield attributable to prepayment risk may be analyzed separately from that attributable to non-prepayment risk factors (e.g., the credit quality of the MBS issuer and market liquidity). To perform this analysis, a valuation benchmark curve positively correlated to the MBS yield curve, such as, for example, the swap yield curve or the spread between the swap yield curve and the U.S. Treasury yield curve, may be used as a surrogate for the MBS yield attributable to non-prepayment risk factors. The basis point difference between the MBS yield curve and the benchmark curve (the "prepayment spread") provides an estimated value of the prepayment option. A widening of the prepayment spread indicates an increasing option value and decreasing MBS price, whereas a tightening of the prepayment spread indicates a decreasing option value and increasing MBS price.

For MBS valuation methodologies currently in use, understanding and predicting changes in the prepayment spread is often based on a qualitative analysis of past prepayment spread changes. Such analysis, however, does not facilitate an understanding of prepayment spread dynamics in terms of one or more current macroeconomic factors and may thus result in a less-than-optimal MBS investment strategy.

SUMMARY

In one general respect, embodiments of the present invention are directed to a method for modeling a current expected prepayment spread for a MBS as a function of a current refinance activity. According to various embodiments, the method comprises the steps of computing a historical MBS prepayment spread value and determining a historical refinance activity value for each of a plurality of historical time values. The historical MBS prepayment spread value and the corresponding historical refinance activity value define a data pair. The method further comprises the step of processing the data pairs to determine terms of a multiple-term mathematical formula that is used to calculate the current expected prepayment spread. The terms of the formula may include as a variable the current refinance activity.

In another general respect, embodiments of the present invention are directed to a method for determining a current value of a MBS. According to various embodiments, the method comprises the steps of computing a first current prepayment spread value for the MBS, computing a second current prepayment spread value for the MBS, and determining the current value of the MBS based upon a comparison of the first current prepayment spread to the second current prepayment spread.

In yet another general respect, embodiments of the present invention are directed to a computer-readable medium containing computer-executable instructions for computing a historical MBS prepayment spread value and determining a historical refinance activity value for each of a plurality of historical time values. The historical MBS prepayment spread value and the corresponding historical refinance activity value define a data pair. The computer-readable medium may further contain computer-executable instructions for processing the data pairs to determine terms of a multiple-term mathematical formula that is used to calculate the current expected prepayment spread. The terms of the formula may include as a variable the current refinance activity.

In yet another general respect, embodiments of the present invention are directed to a system for modeling a current expected prepayment spread for a MBS as a function of a current refinance activity. According to various embodiments, the system may include a derivation module for computing a historical MBS prepayment spread value and determining a historical refinance activity value for each of a plurality of historical time values. The historical MBS prepayment spread value and the corresponding historical refinance activity value define a data pair. An additional function performed by the derivation module may include processing the data pairs to determine terms of a multiple-term mathematical formula that is used to calculate the current expected prepayment spread. The terms of the formula include as a variable the current refinance activity. The system may further include a database in communication with the derivation module for storing the mathematical formula, and an application module for retrieving the mathematical formula from the database and for computing the current expected prepayment spread based upon the mathematical formula and a current refinance activity value.

DESCRIPTION OF THE FIGURES

Various embodiments of the present invention will be described by way of example in conjunction with the following figures, wherein:

FIG. 2 shows a MBS-to-swap spread curve and an refinance activity curve obtained by plotting MBS-to-swap spread values and refinance activity values of FIG. 1A, respectively, as a function of date;

DETAILED DESCRIPTION

The present invention, according to various embodiments, is directed to methods and related systems for computing an expected prepayment spread value for an MBS using a one-factor model having as input a current refinance activity value. Such methods and systems are useful for, among other things, identifying pricing discrepancies between fair MBS price and market MBS price, thus uncovering arbitrage investment opportunities.

Figure 1A:
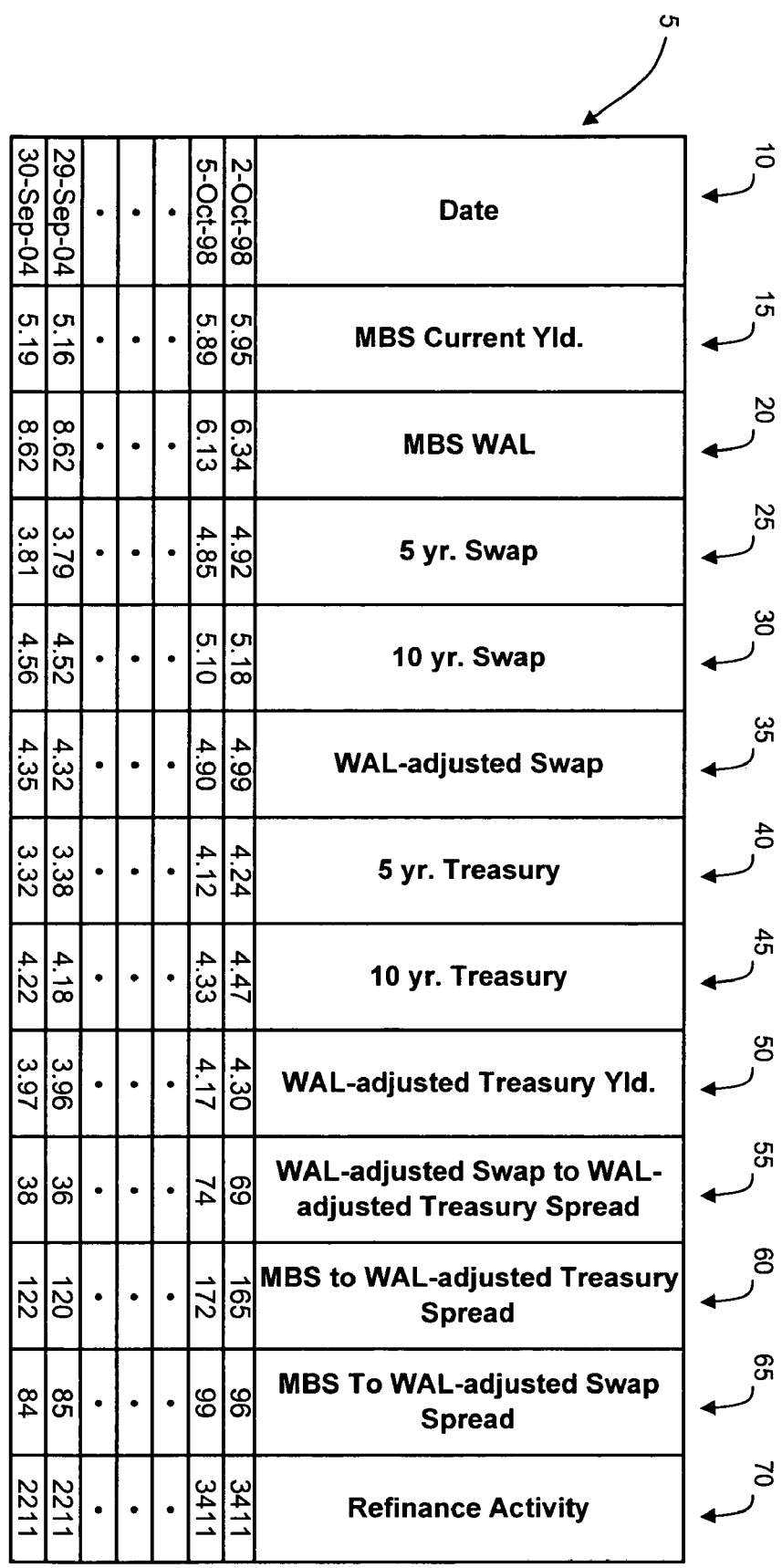
FIG. 1A shows a data set containing data for computing prepayment spread values.

FIG. 1A shows a data set 5 containing historical data for computing prepayment spread values associated with a MBS over a selected period of time. According to various embodiments, the MBS may be an agency MBS such as, for example, a 30-year Ginnie Mae (GNMA) MBS. Data set 5 entries are ordered by date 10 and include a MBS current yield value 15, a MBS weighted-average-life (WAL) value 20, a five-year swap value 25, a ten-year swap value 30, a WAL-adjusted swap value 35, a five-year treasury yield value 40, a ten-year treasury yield value 45, a WAL-adjusted treasury yield value 50, a WAL-adjusted swap to WAL-adjusted treasury ("swap-to-treasury") spread value 55, a MBS to WAL-adjusted treasury ("MBS-to-treasury") spread value 60, a MBS to WAL-adjusted swap ("MBS-to-swap") spread value 65 (i.e., the prepayment spread), and a refinancing activity value 70. For purposes of clarity, only a representative portion of the entries of data set 5 is shown in FIG. 1A. It can be appreciated that other data sets similar to data set 5 can be constructed for other types of MBSs.

The MBS current yield value 15 is computed as the current coupon rate of the MBS divided by the market price of the MBS on the corresponding date 10 and may be obtained from any of a variety of financial reporting services and/or publications such as, for example, the below, the MBS WAL value 20 may be used for defining a point on a valuation benchmark curve having a maturity equal to the MBS WAL value 20.

According to various embodiments, the spread between the swap yield curve and the U.S. Treasury yield curve may be used as a valuation benchmark for representing the amount of MBS yield attributable to non-prepayment risk factors. The swap yield curve reflects the rates received by fixed-rate payors in return for paying LIBOR for a pre-determined time period, typically three or six months. Data for swap yield curves and U.S Treasury yield curves of various maturities is available from a variety of sources such as, for example, the Federal Reserve Board. Because the maturities for the reported swap and U.S. Treasury yield curves are typically different than the MBS WAL value 20, swap and U.S. Treasury yield values having maturities equal to the MBS WAL value 20 may be computed by linear interpolation. For example, as seen in FIG. 1A, the MBS WAL value 20 on Oct. 2, 1998 was 6.34 years. The reported five-year and ten-year swap values 25, 30 on that date were 4.92 and 5.18, respectively. Accordingly, the WAL-adjusted swap value 35 corresponding to the MBS WAL value 20 of 6.34 years may be computed as:

$$WAL\text{-adjustment Swap} = 4.92 \times \frac{(5.18 - 4.92)}{5} \times (6.34 - 5) = 4.99$$

Similarly, the WAL-adjusted Treasury yield value 50 corresponding to the MBS WAL value 20 of 6.34 years may be computed using the reported five-year and ten-year Treasury yield values 40, 45 as follows:

$$WAL\text{-adjusted Treasury Yield} = 4.24 \times \frac{(4.47 - 4.24)}{5} \times (6.34 - 5) = 4.30$$

The swap-to-treasury spread value 55, i.e., the basis-point differential between the WAL-adjusted swap value 35 and the WAL-adjusted Treasury yield value 50, may then be computed as follows:

Swap-to-Treasury Spread=(4.99–4.30)×100=69

The MBS-to-treasury spread value 60, i.e., the basis-point differential between the MBS yield value 15 and the WAL-adjusted Treasury yield value 50, may then be computed as:

MBS-to-Treasury Spread=(5.95–4.30)×100=165

The MBS-to-swap spread value 65, i.e., the basis-point differential between the MBS yield value 15 and the WAL-adjusted swap value 35, may then be computed as:

MBS-to-Swap Spread=(5.95–4.99)×100=96

The refinancing activity value 70 corresponds to the most recent value of the refinance index for corresponding date 10. The refinance index value is updated weekly by the Mortgage Banker Association (MBA) based on mortgage banker survey data and represents the level of refinancing activity by residential and commercial mortgagors. Increases and decreases in the refinance index are thus indicative of increases and decreases in refinancing activity, respectively. As discussed below in connection with FIG. 2, a high degree of correlation may be shown to exist between the refinancing activity value 70 and the MBS-to-swap spread value 65.

Figure 1B:
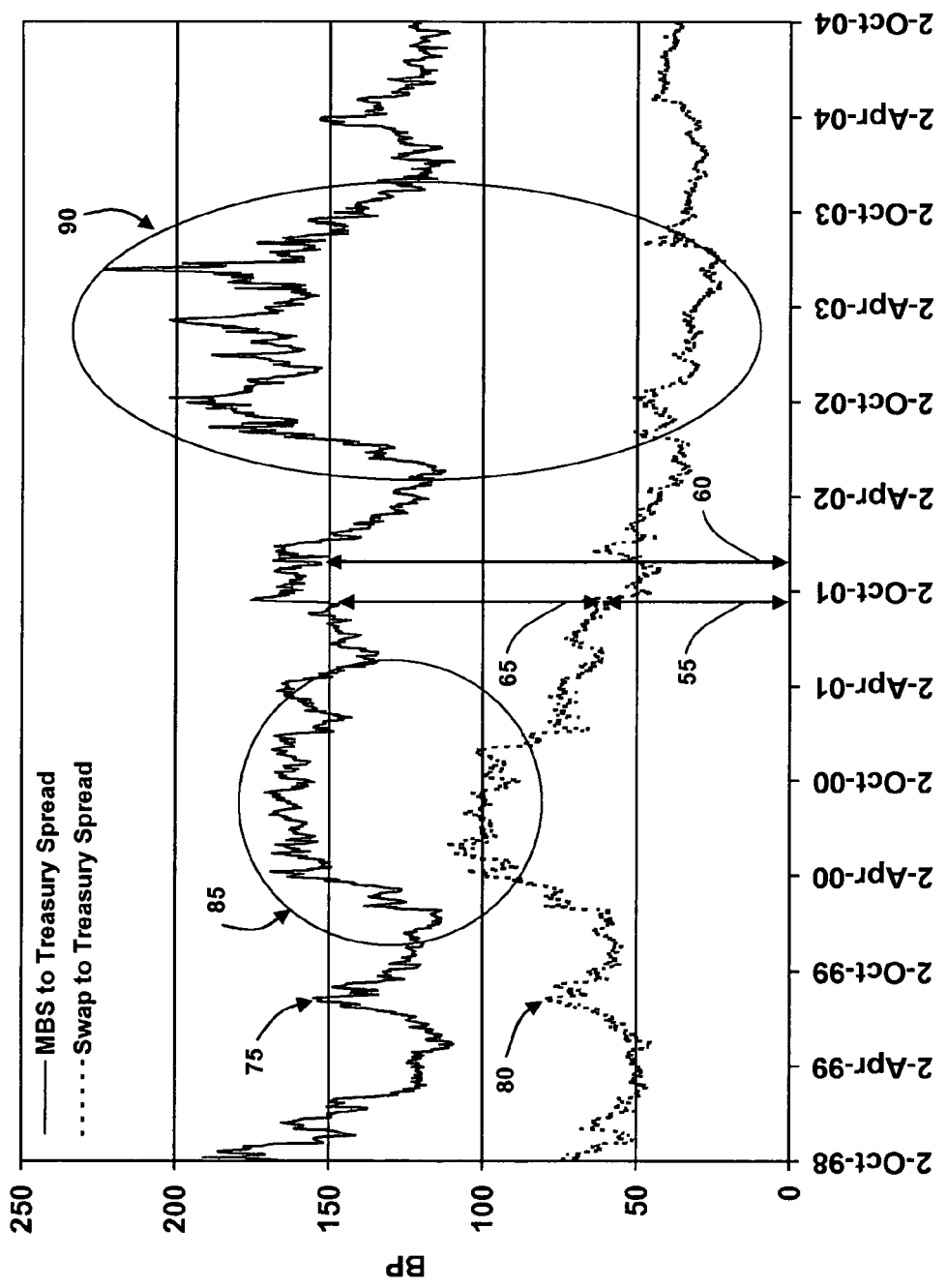
FIG. 1B shows a MBS-to-treasury spread curve and a MBS-to-swap spread curve obtained by plotting MBS-to-treasury spread values and swap-to-treasury spread values of FIG. 1A, respectively, as a function of date.

FIG. 1B shows a MBS-to-treasury spread curve 75 and a MBS-to-swap spread curve 80 obtained by plotting each MBS-to-treasury spread value 60 and swap-to-treasury spread value 55 of data set 5, respectively, as a function of their corresponding date 10. Changes in the value of the prepayment option over time is indicated by changes in the spread between the curves 75, 80 (i.e., changes in the MBS-to-swap spread value 65). First and second regions 85, 90 highlighting portions of curves 75, 80 are instructive in this regard. In particular, as seen within the first region 85, the MBS-to-treasury spread curve 75 correlates in an overall manner with the MBS-to-swap spread curve 80, and the MBS-to-swap spread values 65 within the first region 85 are generally smaller than those outside of its bounds. Accordingly, the first region 85 marks a tightening of the spread between the MBS-to-treasury spread curve 75 and the MBS-to-swap spread curve 80 and, thus, higher MBS prices. Within the second region 90, by contrast, the MBS-to-treasury spread curve 75 is characterized by a series of sharp divergences relative to the MBS-to-swap spread curve 80, giving rise to MBS-to-swap spread values 65 that are large compared to those of the first region 85. Accordingly, the second region 90 marks a widening of the spread between the MBS-to-treasury spread curve 75 and the MBS-to-swap spread curve 80 and, thus, lower MBS prices.

FIG. 2 shows a MBS-to-swap spread curve 95 and a refinance activity curve 100 obtained by plotting each MBS-to-swap spread value 65 and refinance activity value 70 of data set 5, respectively, as a function of their corresponding date 10. Scales for each of the curves 95, 100 are shown on the left and right vertical axis of FIG. 2, respectively. As seen in FIG. 2, the general features of the MBS-to-swap spread curve 95 correspond closely to those of the refinance activity curve 100, thus demonstrating the usefulness of the refinance index for quantifying MBS-to-swap spread values 65 and for forecasting changes therein.

Figure 3:
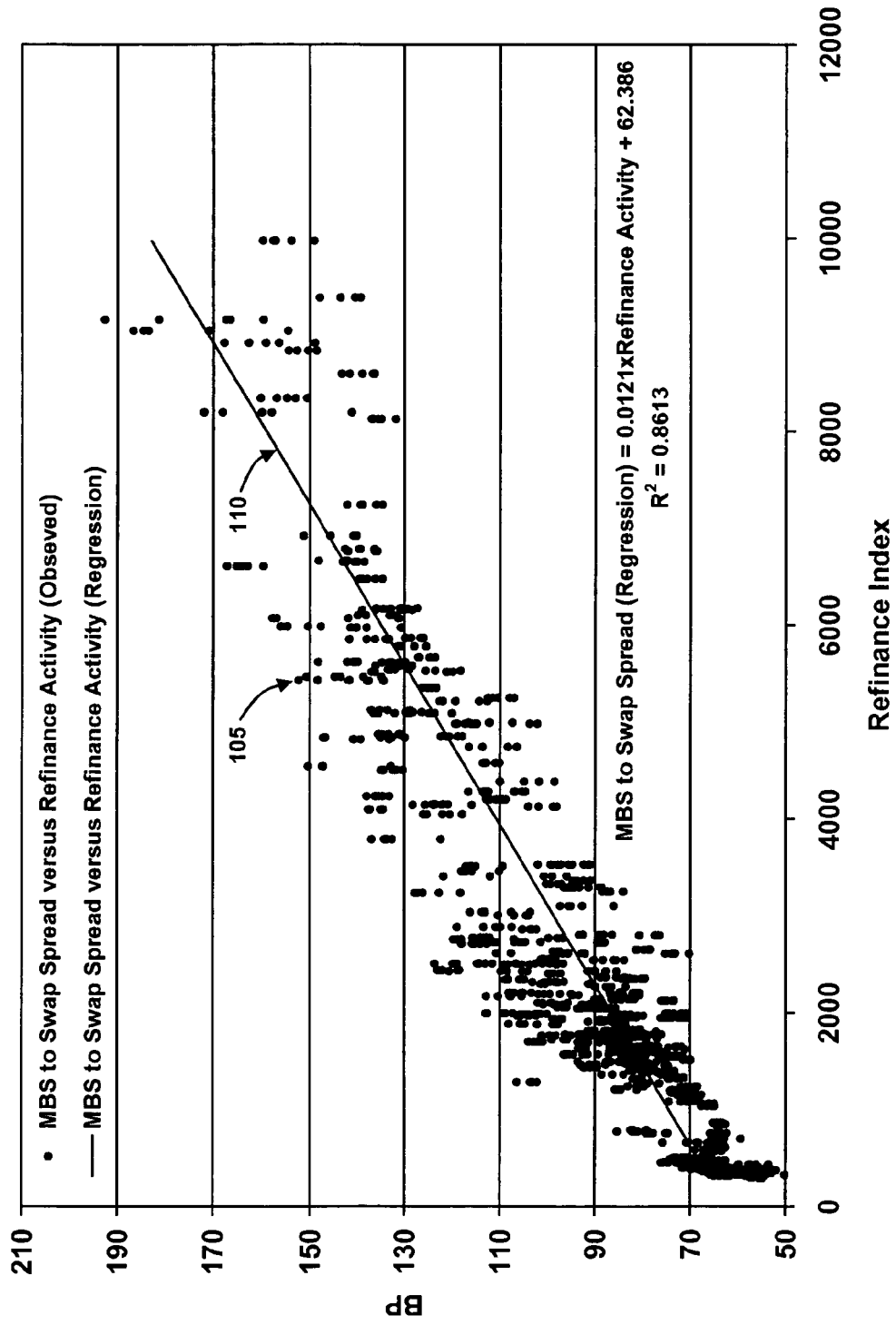
FIG. 3 shows an application of a linear regression analysis for developing a one-factor model that may be used to generate an expected MBS-to-swap spread value based on a corresponding refinance activity value.

FIG. 3 shows an application of a linear regression analysis for developing a one-factor model that may be used for generating an expected MBS-to-swap spread value based on a corresponding refinance activity value 70, according to various embodiments. The use of a linear regression of the form $y = \alpha + \beta x + \epsilon$, wherein $\alpha$ and $\beta$ are determined using least-squares fitting techniques and $\epsilon$ represents the error, is well known in the art and is thus not discussed at length herein. In FIG. 3, a scatter-plot 105 constructed by plotting each MBS-to-swap spread value 65 of data set 5 versus its corresponding refinance activity value 70 is shown. The application of a linear regression analysis to the data points of the scatter plot 105 defines a one-factor linear model for generating an expected MBS-to-swap spread value based upon a corresponding refinance activity value 70 as follows:

MBS-to-Swap Spread (Regression)=0.0121×Refinance Activity+62.386

As shown in FIG. 3, value of the coefficient of determination, $R^2$, is 0.8613, indicating that a large degree of the variation in the MBS-to-swap spread values 65 is accounted for by the refinance activity values 70. A plot of the regression-based MBS-to-swap spread output generated by the one-factor model as a function of refinance activity is shown in FIG. 3 as trendline 110.

Figure 4A:
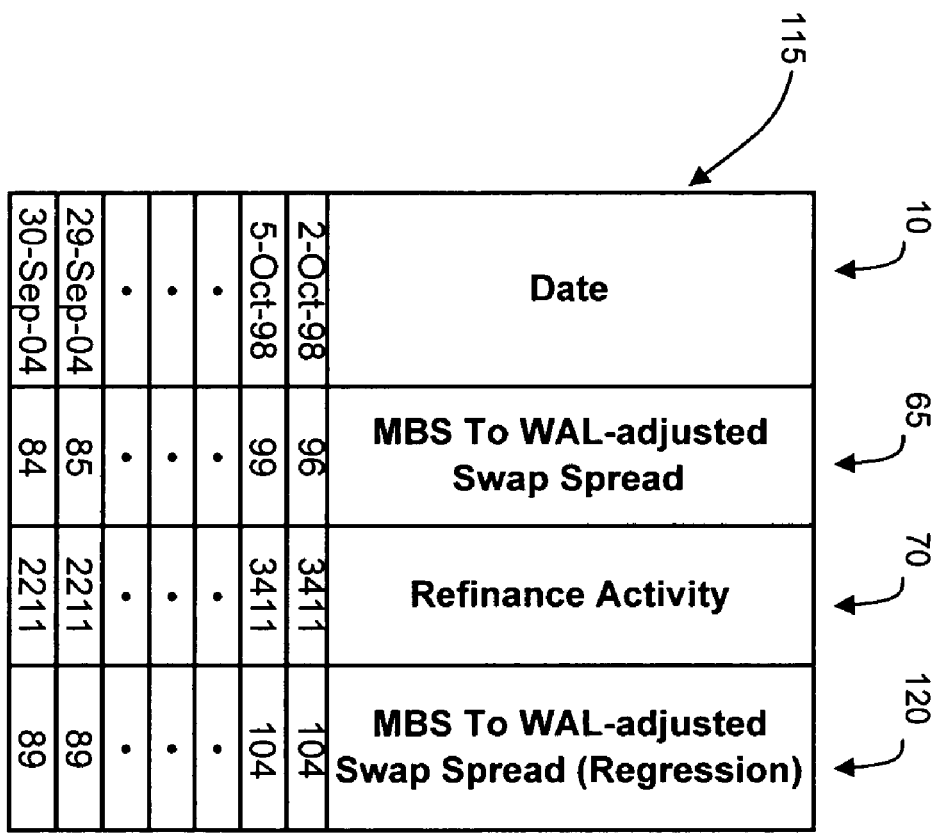
FIG. 4A shows a data set containing an expected MBS-to-swap spread value generated using the one-factor model defined in FIG. 3 for each refinance activity value.
Figure 4B:
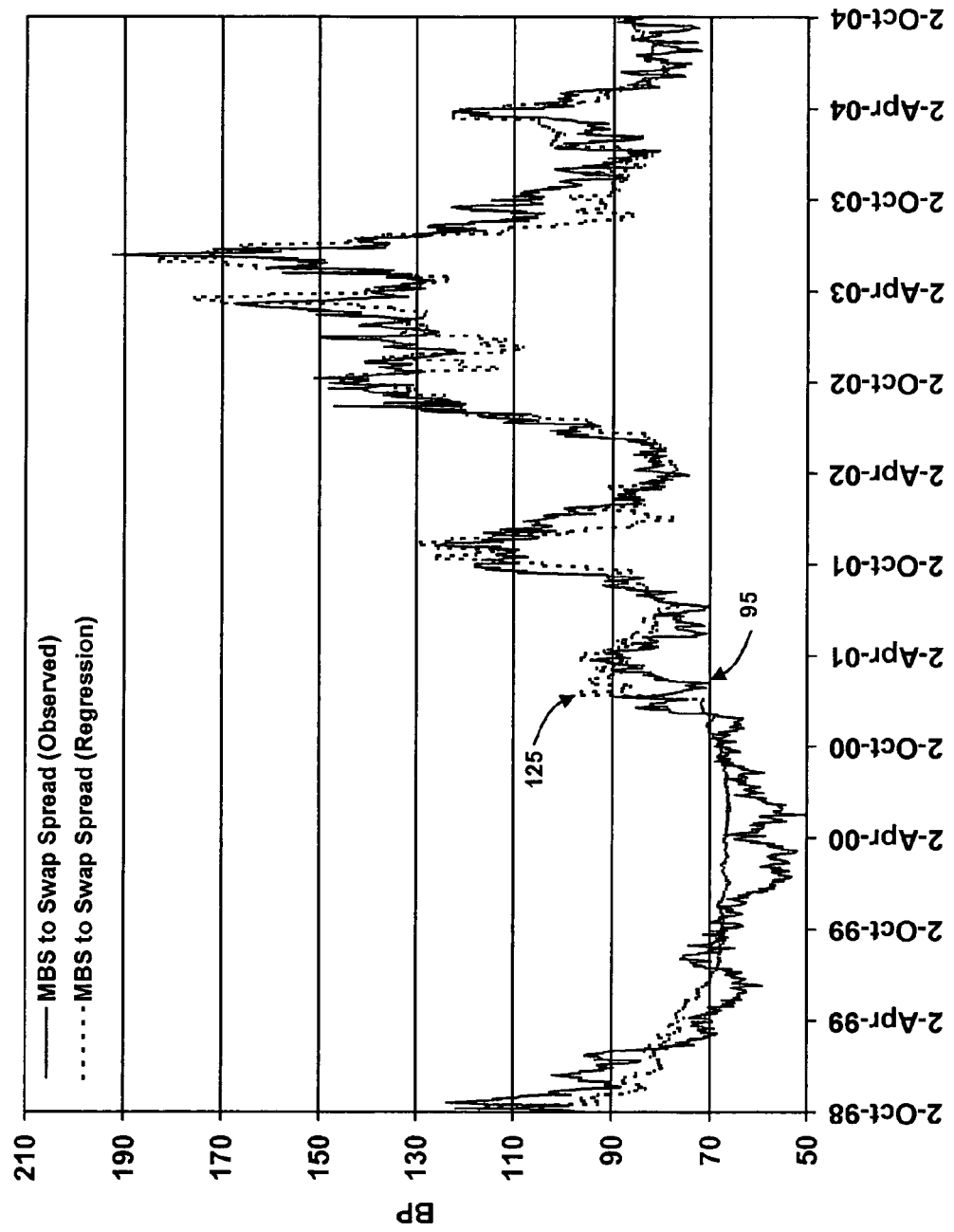
FIG. 4B shows a comparison of the MBS-to-swap spread curve of FIG. 2 to a MBS-to-swap spread curve defined by the one-factor model of FIG. 3.

FIG. 4A shows a data set 115 containing an expected MBS-to-swap spread value 120 generated using the one-factor model defined in FIG. 3 for each refinance activity value 70. FIG. 4B shows a comparison of the MBS-to-swap spread curve 95 of FIG. 2 to a regression-based MBS-to-swap spread curve 125 constructed by plotting each expected MBS-to-swap spread value 120 of data set 115 versus its corresponding date 10. As seen in FIG. 4B, the expected MBS-to-swap spread values 120 computed using the one-factor model correspond closely to the MBS-to-swap spread values 65 of data table 5. The one-factor model may thus be used to accurately model prepayment spread dynamics in terms of a macroeconomic factor, i.e., the level of refinance activity as measured by the refinance index.

According to various embodiments, the above-described one-factor model may be used to determine the "fair" prepayment spread value for a MBS as a function of refinance activity. Disparities between fair MBS price and market MBS price may be identified by comparing model-generated prepayment spread values to prepayment spreads values observed in the market. Such pricing disparities may arise, for example, from market frictions or from an imbalance in MBS supply and demand. Knowledge of pricing disparities enables a MBS investor to profit using an arbitrage-based investment strategy. For example, when the prepayment spread value generated by the one-factor model is larger than that observed in the market (i.e., the fair MBS price is less than the market price), a MBS investor may take a short position in MBSs in anticipation that the market price will decrease to reflect the price dictated by the model-generated prepayment spread. Conversely, where the prepayment spread value generated by the one-factor model is smaller than that observed in the market (i.e., the fair MBS price is more than the market price), a MBS investor may take a long position in MBSs in anticipation that the market price will eventually increase to reflect the price dictated by the smaller model-generated prepayment spread.

Figure 5:
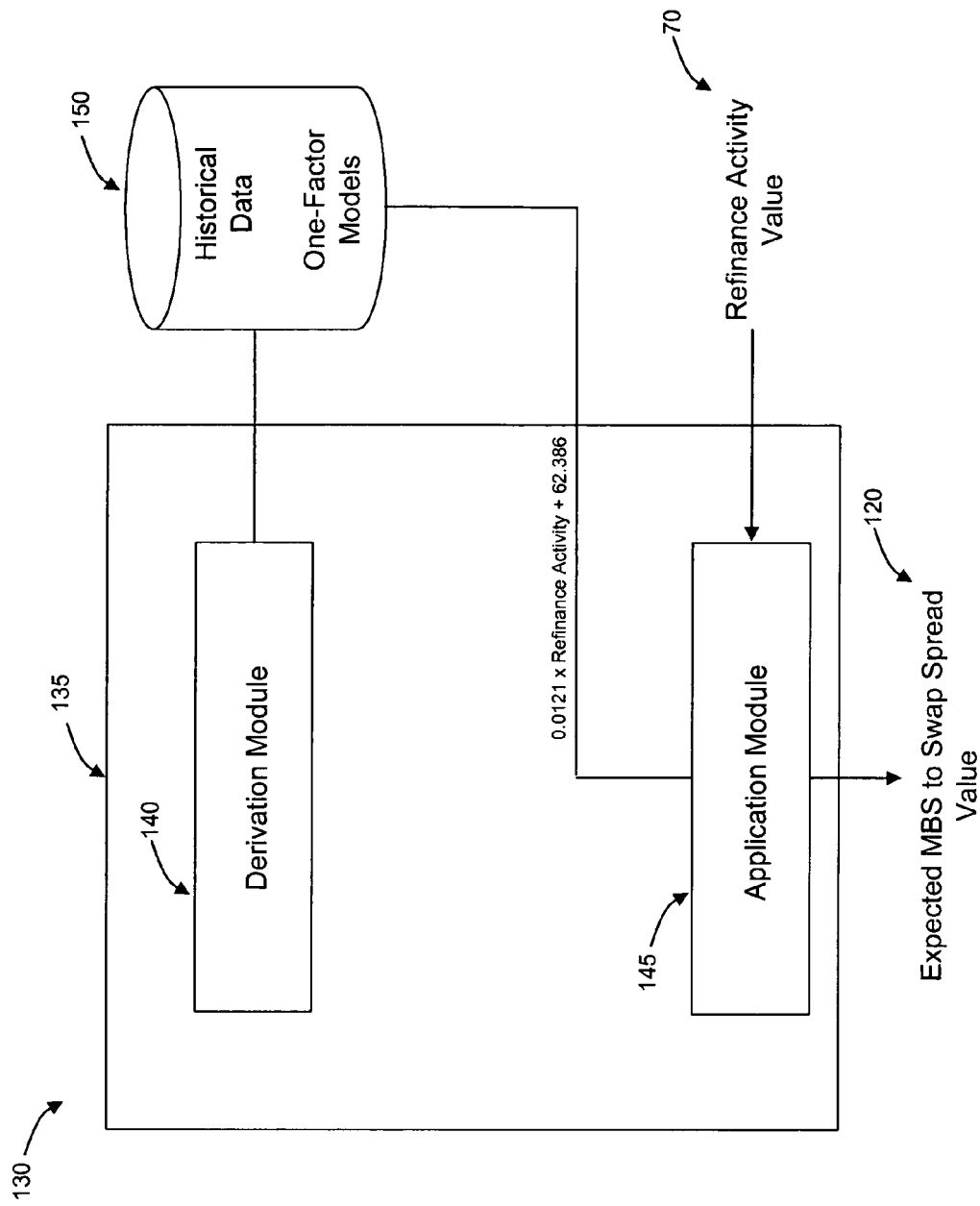
FIG. 5 shows a computer system for deriving and applying a one-factor model.

FIG. 5 is a diagram of a computer system 130 for deriving and applying the above-described one-factor model, according to various embodiments. The computer system 130 may include a computing device 135, which may be implemented as one or more networked computers, such as personal computers, servers, etc. The computer system 130 may include a derivation module 140 and an application module 145. The modules 140, 145 may be implemented as software code to be executed by a processor (not shown) of the computing device 135 using any suitable computer language such as, for example, Java, C, C++, Virtual Basic or Perl using, for example, conventional or object-oriented techniques. The software code for each module 140, 145 may be stored as a series of instructions or commands on a computer-readable medium, such as a random access memory (RAM), a read-only memory (ROM), a magnetic medium such as a hard drive or a floppy disk, or an optical medium, such as a CD-ROM or DVD-ROM.

The derivation module 140 may be configured to derive a one-factor model that may subsequently be used for computing an expected MBS-to-swap spread value 120 based on an input refinance activity value 70. As discussed above in connection with FIG. 3, the process of deriving a one-factor model for a particular MBS may include application of a linear regression algorithm to a plurality of historical MBS-to-swap spread values 65 and corresponding historical refinance activity values 70. Historical data necessary for the derivation of a one-factor model may be stored in a database 150 that is in communication with the derivation module 140. The historical data may include, for example, a plurality of dates 10 and corresponding MBS current yield values 15, MBS WAL values 20, five and ten-year swap values 25, 30, five and ten-year treasury yield values 40, 45, and refinance activity values 70. Although not necessary, historical data may also include WAL-adjusted swap values 35, WAL-adjusted treasury yield values 50, swap-to-treasury spread values 55, MBS-to-treasury spread values 60, and MBS-to-swap spread values 65. Alternatively, these values 35, 50, 55, 60, 65, may be computed as needed by derivation module 140 based on stored values 15, 20, 25, 30, 40, 45 in accordance with the calculations discussed above in connection with FIG. 1A. Because the database 150 may be configured to store historical data for any number of MBSs, the derivation module 140 may store a derived model for each MBS in the database 150 for future use.

According to various embodiments, a time range for specifying the historical data to be used for deriving a one-factor model for a particular MBS may be manually input into the derivation module 140 by a user of the computer system 130. For example, one user may wish to derive a one-factor model for a particular MBS using historical data from the most recent three months, whereas another user may wish to derive a one-factor model for the same MBS using historical data from the most recent year. Furthermore, historical data stored in the database 150 may be augmented with new historical data as it becomes available. Thus, according various embodiments, a user of the computer system 130 may be provided with an option to periodically update (i.e., "re-derive") one or more stored one-factor models to reflect the most recent historical data. According to other embodiments, the one-factor model derivation module 140 may be configured to automatically update stored one-factor models when new historical data is added to the database 150.

The application module 145 may be configured to compute an expected MBS-to-swap spread value 120 based on an input refinance activity value 70 using a one-factor model previously derived and stored in the database 150. According to various embodiments, a user of the computer system 130 may provide as input into the application module 145 a name of a particular MBS for which an expected swap spread value 120 is needed. Based upon the MBS name received as input from the user, the application module 145 may retrieve the appropriate one-factor model from the database 150 and compute an expected swap spread value 120 corresponding to the input refinance activity value 70. According to various embodiments, the refinance activity value 70 input may be automatically input from an external data source. According to other embodiments, a user may manually input a refinance activity value 70 into the application module 145.

While several embodiments of the invention have been described, it should be apparent, however, that various modifications, alterations and adaptations to those embodiments may occur to persons skilled in the art with the attainment of some or all of the advantages of the present invention. In embodiments of the computer system 130 of FIG. 5, for example, the derivation module 140 may be configured to communicate one-factor models directly to the application module 145. According to such embodiments, the derivation module 140 may derive the needed one-factor model "on-the-fly," thus eliminating the need for storing one-factor models in the database 150.

We claim:

1. A computer-implemented method for modeling a current expected prepayment spread for a mortgage-backed security (MBS) as a function of a current refinance activity, the method comprising:
    for each of a plurality of historical time values:
        computing a historical MBS prepayment spread value; and
        determining a historical refinance activity value;
        wherein the historical MBS prepayment spread value and the corresponding historical refinance activity value define a data pair;
    processing the data pairs corresponding to the plurality of historical time values to determine the current expected prepayment spread in accordance with the current refinance activity.

2. The method of claim 1, wherein computing a historical MBS prepayment spread value for each of the plurality of historical time values includes:
    determining a historical MBS yield value for the corresponding historical date;
    computing a historical benchmark yield value for the corresponding historical date; and
    computing a spread between the historical MBS yield value and the historical benchmark yield value.

3. The method of claim 2, wherein computing a historical benchmark yield value includes computing a historical swap value.

4. The method of claim 3, wherein computing a historical swap value includes computing a historical swap value having a weighted average life equivalent to a weighted average life of the MBS.

5. The method of claim 1, wherein determining a historical refinance activity value includes determining a historical refinance activity value using a published refinance index.

6. The method of claim 1, wherein processing the data pairs includes processing the data pairs using statistical methods.

7. The method of claim 6, wherein processing the data pairs using statistical methods includes processing the data pairs using a linear regression algorithm.

8. A method for determining a current value of a mortgage-backed-security (MBS), the method comprising:
    computing a first current prepayment spread value for the MBS;
    computing a second current prepayment spread value for the MBS; and
    determining the current value of the MBS based upon a comparison of the first current prepayment spread to the second current prepayment spread.

9. The method of claim 8, wherein computing a first current prepayment spread value for the MBS includes computing an observed current prepayment spread value.

10. The method of claim 8, wherein computing a second current prepayment spread value for the MBS includes computing a current expected prepayment spread value based on a current refinance activity value.

11. The method of claim 10, wherein computing a current expected prepayment spread value based on a current refinance activity value includes:
    for each of a plurality of historical time values:
        computing a historical MBS prepayment spread value; and
        determining a historical refinance activity value;
        wherein the historical MBS prepayment spread value and the corresponding historical refinance activity value define a data pair;
    processing the data pairs corresponding to the plurality of historical time values to determine the current expected prepayment spread in accordance with the current refinance activity value.

12. The method of claim 11, wherein computing a historical MBS prepayment spread value for each of the plurality of historical time values includes:
    determining a historical MBS yield value for the corresponding historical date;
    computing a historical benchmark yield value for the corresponding historical date; and
    computing a spread between the historical MBS yield value and the historical benchmark yield value.

13. The method of claim 12, wherein computing a historical benchmark yield value includes computing a historical swap value.

14. The method of claim 13, wherein computing a historical swap value includes computing a historical swap value having a weighted average life equivalent to a weighted average life of the MBS.

15. The method of claim 11, wherein determining a historical refinance activity value includes determining a historical refinance activity value using a published refinance index.

16. The method of claim 11, wherein processing the data pairs includes processing the data pairs using statistical methods.

17. The method of claim 16, wherein processing the data pairs using statistical methods includes processing the data pairs using a linear regression algorithm.

18. A computer-readable medium comprising computer-executable instructions thereon which, when executed by a processor, cause the processor to:
    for each of a plurality of historical time values:
        compute a historical MBS prepayment spread value; and
        determine a historical refinance activity value;
    wherein the historical MBS prepayment spread value and the corresponding historical refinance activity value define a data pair;
    process the data pairs corresponding to the plurality of historical time values to determine a current expected prepayment spread in accordance with a current refinance activity.

19. The medium of claim 18, wherein the instructions cause the processor to process the data pairs using a linear regression algorithm.

20. A computer-implemented system for modeling a current expected prepayment spread for a mortgage-backed security (MBS) as a function of a current refinance activity, the system comprising:
    a derivation module, wherein the derivation module is for:
    for each of a plurality of historical time values:
        computing a historical MBS prepayment spread value; and
        determining a historical refinance activity value;
    wherein the historical MBS prepayment spread value and the corresponding historical refinance activity value define a data pair; and
    processing the data pairs corresponding to the plurality of historical time values to determine a model that is used to calculate the current expected prepayment spread, wherein the model includes as a variable the current refinance activity;
    a database in communication with the derivation module for storing the model; and
    an application module for retrieving the model from the database and for computing the current expected prepayment spread based upon the model and a current refinance activity value;
    wherein the application module is stored in a computer-readable medium.

* * * * *